United States Patent

Shimizu et al.

[11] Patent Number: 6,057,937
[45] Date of Patent: *May 2, 2000

[54] IMAGE READING APPARATUS

[75] Inventors: Satoshi Shimizu; Hitoshi Inoue, both of Yokohama; Akio Saigusa, Utsunomiya, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,221

[22] Filed: Mar. 27, 1997

[30] Foreign Application Priority Data

Apr. 2, 1996 [JP] Japan ................................. 8-104712

[51] Int. Cl.[7] ............................. H04N 1/21; G03G 15/00
[52] U.S. Cl. ......................... 358/302; 358/296; 358/528; 399/370; 399/376
[58] Field of Search ................................. 358/296, 298, 358/443, 448, 449, 452, 462, 528, 302; 355/74; 395/102; 399/86, 190, 370, 376

[56] References Cited

U.S. PATENT DOCUMENTS

| | | | |
|---|---|---|---|
| 4,466,072 | 8/1984 | Kaufmann | 364/502 |
| 4,650,316 | 3/1987 | Matsumoto | 355/55 |
| 4,769,679 | 9/1988 | Matsumoto | 355/41 |
| 5,202,774 | 4/1993 | Ishimitsu | 358/488 |
| 5,323,018 | 6/1994 | Rogers et al. | 250/585 |
| 5,430,832 | 7/1995 | Imaizumi et al. | 395/134 |
| 5,444,514 | 8/1995 | Negoro et al. | 355/74 |
| 5,488,377 | 1/1996 | Kinoshita et al. | 358/449 |
| 5,578,809 | 11/1996 | Yamaji et al. | 235/462 |
| 5,644,382 | 7/1997 | Yamamoto | 355/55 |

*Primary Examiner*—Edward H. Tso
*Assistant Examiner*—Gregory J. Toatley, Jr.
*Attorney, Agent, or Firm*—Fitzpatrick, Cella, Harper & Scinto

[57] ABSTRACT

An image reading apparatus for reading images on films of different sizes and outputting read image data includes a film sensor for sensing the dimension of at least one side of each film and a control module for operating the apparatus so that at least one of the reading process and outputting process is performed under a parameter setting set beforehand in accordance with a signal from the film sensor. When a reading start instruction is issued from a control panel, a film width detecting circuit performs film sensing, thereby determining the film width of each film. Based on the film width, reading parameter values such as a pixel pitch, a density range, and a data transfer destination are selected from among those that are beforehand set through the control panel. Table update is made for a density linear conversion table according to the film width and an interpolation coefficient according to the pixel pitch. Each film is read through a halogen driving circuit and an actuator driving circuit, and the image data is output through an image data reading circuit.

32 Claims, 9 Drawing Sheets

IMAGE READING APPARATUS

BACKGROUND OF THE INVENTION

1. Field of the Invention

The present invention relates to an image reading apparatus which produces a digital image signal by reading an image from an X-ray film having the image thereon.

2. Description of the Related Art

Conventional image reading apparatuses need different parameter settings, depending on the size of a sheet, to read the image formed on the sheet. The parameters to be set for imaging include the pitch of pixels, the level of gradation of the image, the range of density of the image, the data format of image data, the destination of data transfer and the like. For instance, in image reading apparatuses for reading a medical image formed on an X-ray film, the sizes of the X-ray films are typically 14 inches×14 inches and 14 inches×17 inches for chest X-ray imaging and 8 inches×10 inches for breast X-ray imaging. The images formed on the X-ray films are different in characteristics depending on applications; for instance, the image for the breast is higher in resolution and wider in the range of density than that for chest imaging.

When reading such images by means of an image reading apparatus, setting levels in the pitch of pixels and range of density are different. In an 8-inch×10-inch film used for breast imaging, image reading is preferably performed at a fine pixel pitch and 10-bit gradation or higher in a wide density range to keep imaging degradation to a minimum. In a 14-inch×14-inch film and a 14-inch×17-inch film used for chest imaging, image reading is preferably performed at a large pixel pitch and a medium density range of 8-bit gradation or so in a narrow density range to reduce the amount of data.

In such conventional image reading apparatuses, parameters such as, for example, the pixel size, the level of gradation, the range of density, the data format of image data, and the destination of data cannot be commonly set to meet films of a plurality of different sheet sizes. An operator has to modify parameter settings such as the density range and pixel pitch each time the sheet size is changed. One set of parameter settings is applicable only to sheets of the same sheet size. If films of a plurality of different sheet sizes are read, image reading is performed under the same parameter settings, namely the same pixel pitch, the same level of gradation and the same density range.

SUMMARY OF THE INVENTION

Accordingly, it an object of the present invention to provide an image reading apparatus that is free from the above problem, and is capable of reading films of different sheets sizes without the need of the intervention of an operator for modifying parameter settings of the apparatus.

In accordance with one aspect of the invention, an image reading apparatus for reading and outputting an image on a film and outputting image data includes a film detecting unit for detecting a film size and an image reading system for photoelectrically reading the image on the film. Parameter control setting means sets parameters for reading the film and modifies the parameters according to the film size detected by the film detecting unit. A signal output system processes a signal including image information from the image reading system and outputs the process signal.

In accordance with another aspect of the invention, an image reading method for reading an image on a film and outputting image data includes the steps of detecting a film size, automatically setting parameters for reading the film based on the detected film size, and photoelectrically reading the image information on the film according to the set parameters. In addition, a signal including image information photoelectrically read is processed and output.

These and other objects, aspects and features of the present invention will be more fully understood from the following description of the invention.

DESCRIPTION OF THE PREFERRED EMBODIMENTS

Referring to the drawings, embodiments of the present invention are now discussed.

Figure 1:
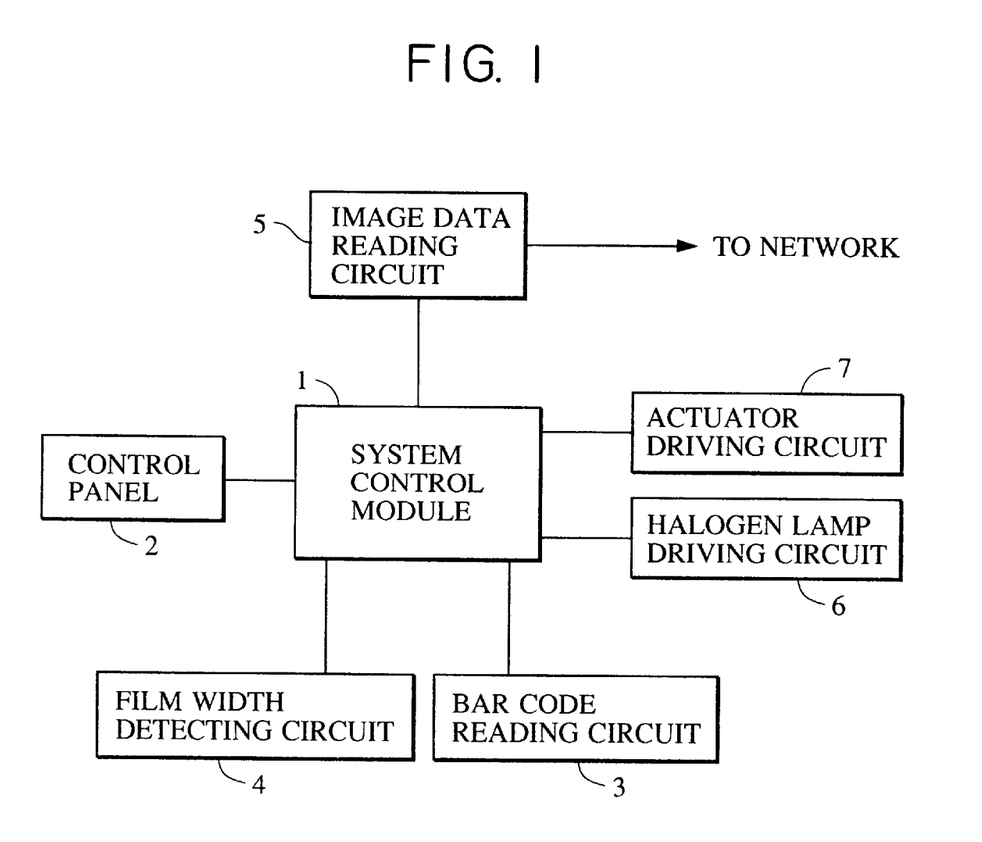
FIG. 1 is a block diagram of an image reading apparatus of one embodiment of the present invention.

FIG. 1 is a block diagram of one embodiment of the present invention. Connected to a system control module 1 for controlling the entire system of an image reading apparatus are a control panel 2 through which an operator controls the apparatus for start reading, sets parameter values, and monitors the operational status of the apparatus and errors, a bar code reading circuit 3 for reading a bar code printed on a bar code label stuck on each film, and a film width sensor circuit 4 for generating a film width signal through a film width sensor when a film is read.

Each of the elements shown in block outline in FIG. 1, as well as in FIGS. 2, 7, 9 and 11, is well known, per se, and a specific type of construction is not critical to carrying out the invention or to a disclosure of the best mode for carrying out the invention.

The output section of the system control module 1 comprises a light receiving device such as a CCD line sensor, its driving circuit and a circuit for collecting and processing data, and is connected to an image data reading circuit 5 for transmitting read image data to an unshown destination computer specified by an operator via a network, a halogen lamp driving circuit 6 as a light source for reading films, and an actuator driving circuit 7 for driving actuators, such as motors, clutches and solenoids, used for detaching and detaching films.

Figure 2:
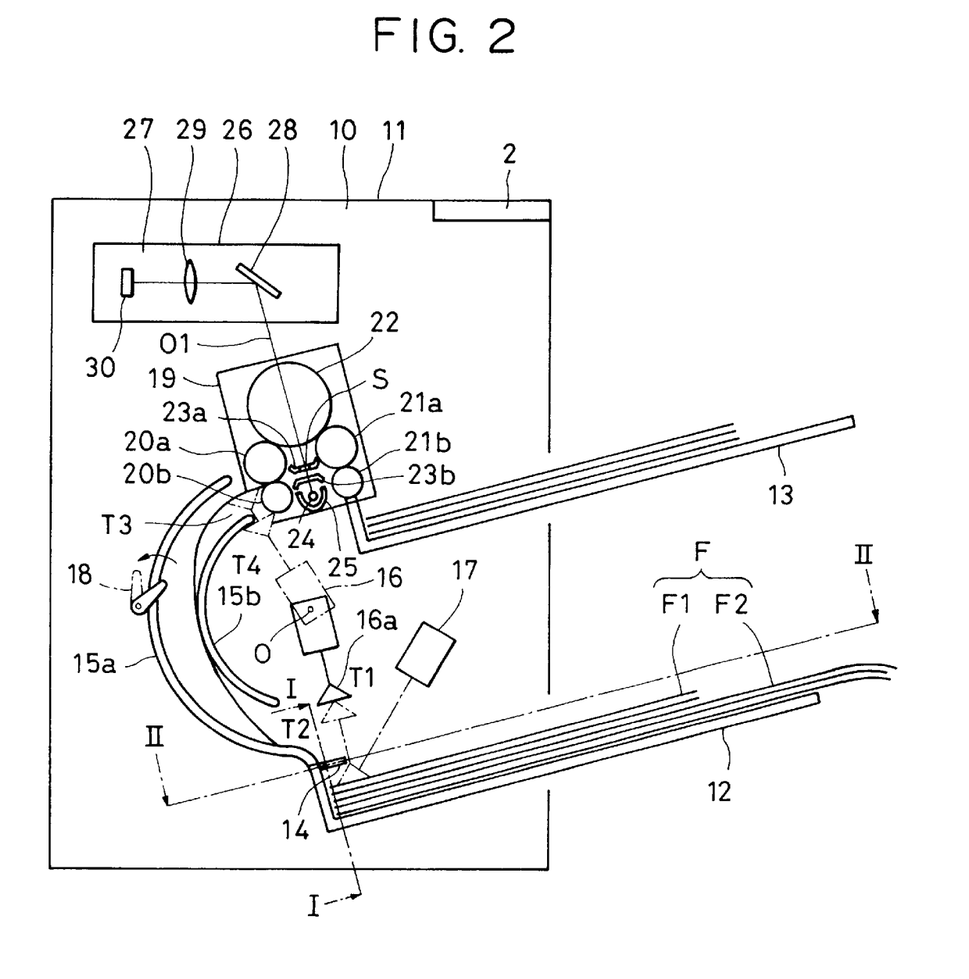
FIG. 2 is a side view of the image reading apparatus.

FIG. 2 is a side view of the image reading apparatus which produces a digital image signal by reading an image from an X-ray film on which the image is formed through X-ray imaging. The image reading apparatus 10 is enclosed by a cover 11. Disposed on the top of the cover 11 is the control panel 2 having a liquid crystal display and switches. An operator uses them to set parameter values, for example to start and stop the apparatus and set a pixel pitch.

Figure 3:
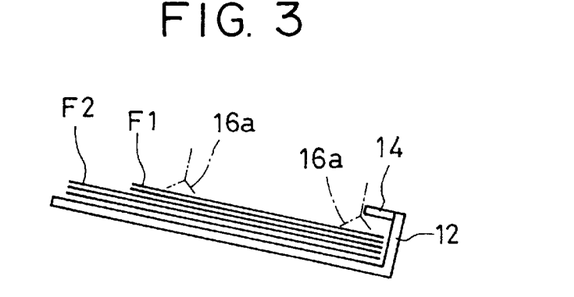
FIG. 3 is a cross-sectional view of a supply tray taken along a line I—I in FIG. 2.
Figure 4:
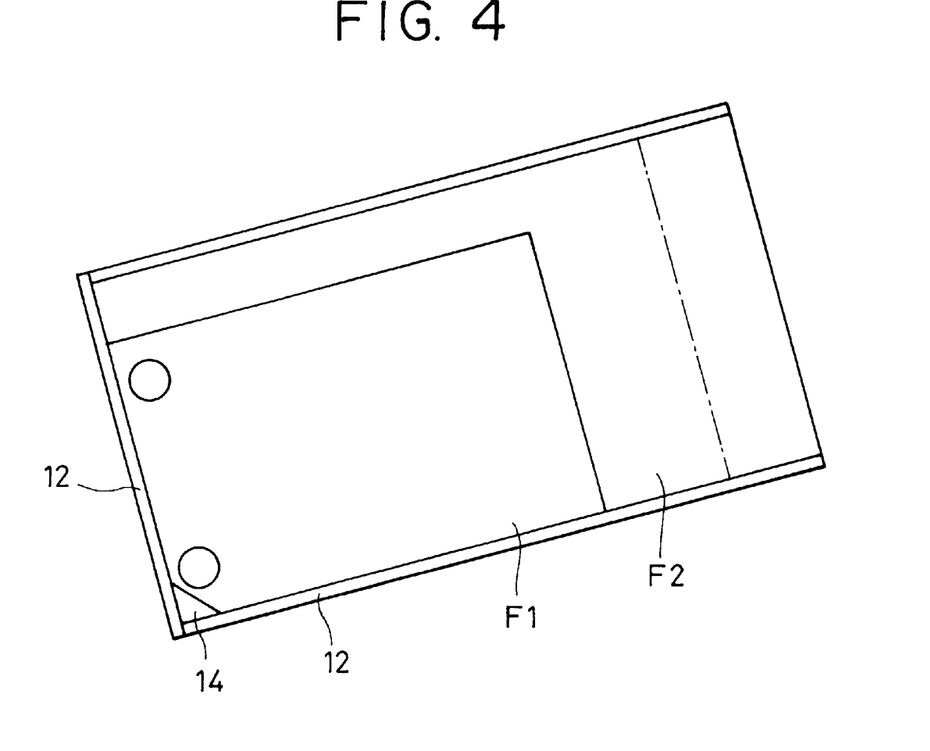
FIG. 4 is a plan view of the supply tray viewed from a line II—II in FIG. 2.

A supply tray 12 is mounted in the apparatus 10 on one side of the cover 11 in a manner that the supply tray 12 is tilted with respect to the apparatus 10. Films F to be read are stacked in the supply tray 12. Mounted above the supply tray 12 is a receive tray 13 for keeping films F that were image read. The receive tray 13 is tilted at the same angle as the supply tray 12 in the direction of the sub scan of the apparatus. The supply tray 12, in which the films F are stacked, has a detaching lug 14 at its one corner to facilitate detaching one film F from the remaining films F. FIG. 3 is a cross-sectional view of the supply tray 12 taken along a line I—I in FIG. 2 and FIG. 4 is a plan view of the supply tray 12 viewed along a line II—II in FIG. 2. As shown in FIG. 4, films F1 and F2 having different lengths and widths can be read in succession by aligning them on their bottom sides in the supply tray 12.

Disposed between the supply tray 12 and the receive tray 13 are arc-shaped guide plates 15a, 15b forming a transport path for the films F, and a transport mechanism 16 having a suction cup 16a is mounted inside the arcs of the guide plates 15a, 15b. The transport mechanism 16 moves its suction cup 16a vertically and pivotally. The suction cup 16a is pivoted with one film F sucked, and the film F is smoothly moved through the transport path between the outer and inner arc-shaped guides 15a and 15b while being in contact with the guides 15a and 15b. Load variations the guide plates 15a and 15b impose on the film are minimized when the film is scanned at a regular speed transport.

A bar code reading device 17 of a laser scanning type is arranged in the vicinity of the inner end of the supply tray 12. The bar code reading device 17 scans a bar code label stuck on the surface of the film F to read the ID number of the film F and transmit it to the system control module 1. A plurality of film width sensors 18 are arranged at predetermined positions on the guide plate 15a along the width of the film F. When the film F advances past the film width sensors 18, they are pivoted to positions represented by a dotted outline in FIG. 2 generating pass signals of the film F. A combination of the pass signals determines the width of the advancing film.

A sub-scan mechanism 19 is arranged between the film delivery opening of the guide plates 15a, 15b and the receive tray 13. The sub-scan mechanism 19 has a pair of sub-scan rollers 20a, 20b and a pair of rollers 21a, 21b, and arranged between rollers 20a, 21a is a power transmission pulley 22. Either the roller 20a or 20b is driven by an unshown motor, and its rotational speed is switched in a stepwise fashion so that a desired rotational speed may be selected from among a plurality of sub-scan speeds for driving the film F. The rollers 20b, 21b are urged against the rollers 20a, 21a, respectively, at appropriate force by unshown springs. Also, the power transmission pulley 22 is urged against the rollers 20a, 20b at an appropriate force by an unshown spring.

Guide plates 23a, 23b are arranged between the two pairs of rollers 20a, 20b and 21a, 21b, and have smooth finish on their mutually inner surfaces to minimize friction with the film F being advanced. The guide plates 23a, 23b have slits S extended in alignment with the main-scan direction of the film F. Arranged on an optical axis 01 passing through the slit S to the side of the guide plate 23b are a halogen lamp 24 lit by the halogen lamp driving circuit 6 shown in FIG. 1 and a concave mirror 25. Unwanted scattering light from the film F that is illuminated by the halogen lamp 24 is blocked by the slits S.

Figure 5:
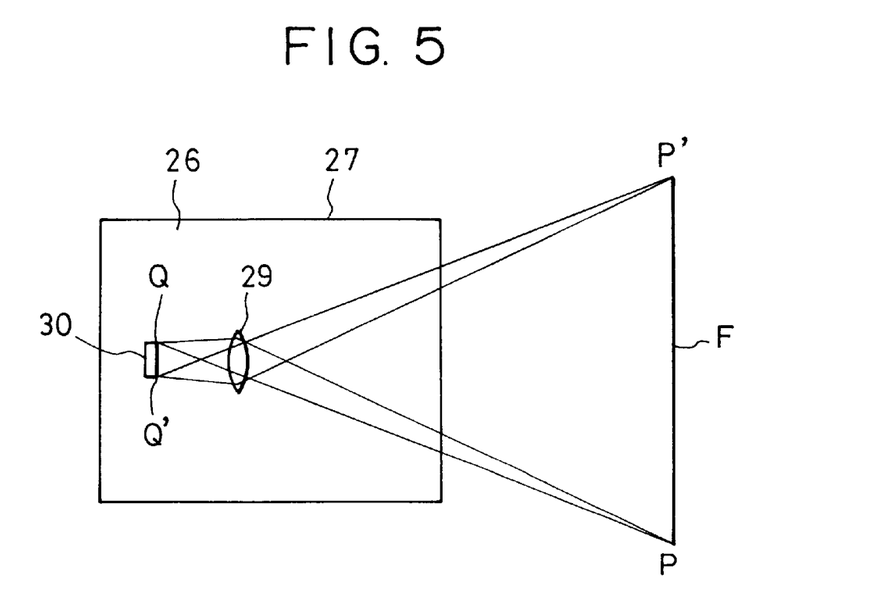
FIG. 5 is a cross-sectional view of an optical system.

Arranged above the sub-scan mechanism 19 is an optical unit 27 that is made substantially light-tight with a cover 26 as shown in FIG. 5. The optical unit 27 has a mirror 28 (omitted in FIG. 5 but shown in FIG. 2) on the optical axis 01, and, further in the direction of reflection of the mirror 28, a lens 29 and a CCD 30 having a linear array of 7500 cells or pixels tightly and equally spaced.

A light beam is transmitted through the lens 29 to cause an image P-P' on a film to focus onto each pixel Q-Q' of the CCD line sensor 30. At any given moment, an electric signal corresponding to the density of a miniature spot of the image P-P' is thus obtained in a pitch of 7500 segments per line. In FIGS. 2 and 5, the lens 29 is depicted as a single one. In practice, however, the lens 29 comprises a plurality of lenses.

In this embodiment, the length of the slits S in the main-scan direction remains unchanged regardless of the width of the film F. The length of the slits S in the main-scan direction may be adjusted by an unshown slit length adjusting mechanism to make the length of the slits S approximately equal to the width of the film F. In this way, when the apparatus reads a narrow width film F, this arrangement minimizes an error in reading density arising from unwanted scattering light strayed into the optical system from the sides of the film F.

In the above construction, the operator loads X-ray films in the supply tray 12, and sets parameters using the control panel 2 to specify a pixel pitch, a range of density, the number of gradation, a data format of image data, and a destination of image data. As for the film width, the operator may freely set the parameters as listed in Table 1, for example.

TABLE 1

| Parameter settings for film widths (default values) | | | | |
|---|---|---|---|---|
| Film width | Gradation level | Range of density | Pixel pitch | Data format |
| 355 mm | 8 bits | 0–2 D | 200 μm | JPEG |
| 254 mm | 8 bits | 0–2 D | 200 μm | JPEG |
| 202 mm | 12 bits | 0–3 D | 100 μm | DICOM |

The operator sets these parameters to desired values using the control panel 2. Since the apparatus stores the last settings that were used at the previous operating session, this parameter setting procedure can be skipped if no modification to them is required.

When a start button in the control panel 2 is pressed, the suction cup 16a is lowered down to the supply tray 12. The suction cup 16a sucks the film F at a suction position T1 from the supply tray 12, and is then raised. In the course of the raising operation, the film F is caught by the detaching lug 14, briefly bent at its corresponding corner and thereby detached from the remaining sheets of film. The suction cup 16a stops raising at a suction position T2. The suction cup 16a then pivots at the center of pivot 0 of the transport mechanism 16 moving between the guides plates 15a, 15b and reaches a suction position T3, advancing the film F to the sub-scan mechanism 19. The suction cup 16a releases its suction and is retracted to a position T4 where the suction cup 16a does not interfere with the film F.

A sub scan operation is now performed by the pair of rollers 20a, 20b and the pair of rollers 21a, 21b. The film F that is advancing at a constant speed between the guide plates 23a, 23b is exposed to the light emitted from the lamp 24 below the guide plates 23a, 23b. The transmitted light is focused on the CCD line sensor 30 in the optical unit 27. The CCD line sensor 30 generates electrical signals for a fixed duration of time, namely digital image signals corresponding to a two-dimensional image. After reading, the film F delivered out by the pair of rollers 21a, 21b is collected in the receive tray 13.

Figure 6:
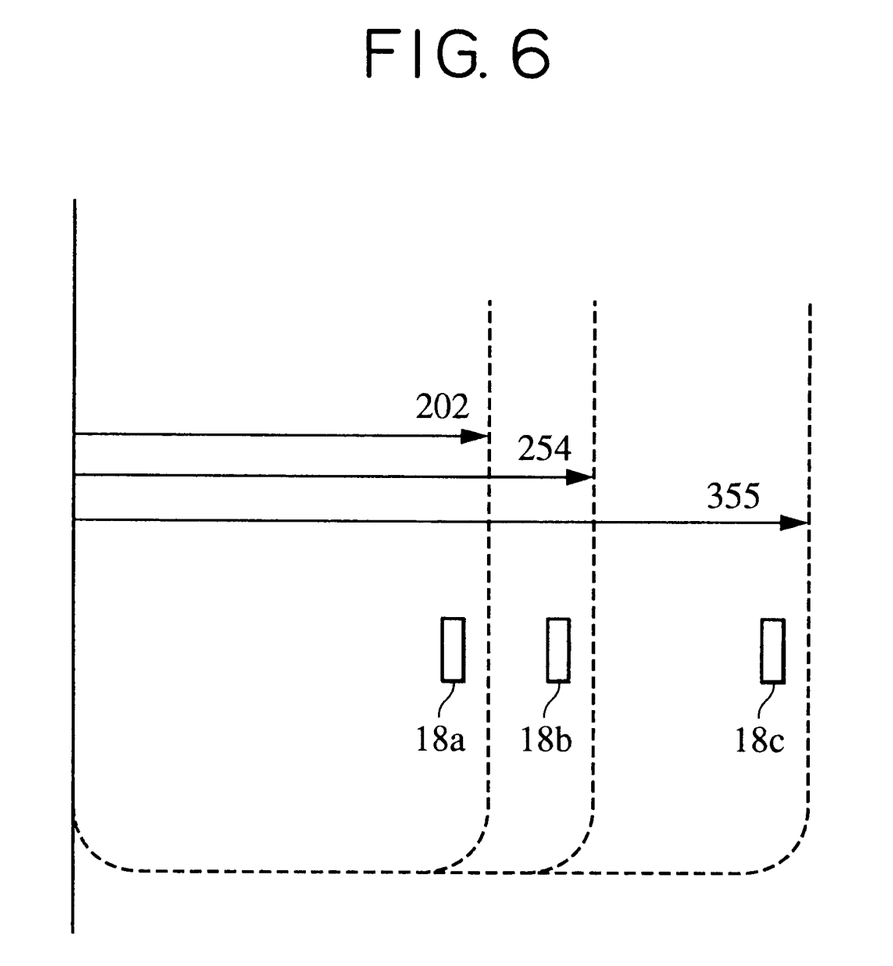
FIG. 6 is an explanatory view of a film width sensor.

When each film is read, the film width sensors 18 determine the width of the film being advanced (namely, the length of the film perpendicular to the page of FIG. 2), and each parameter is automatically set. FIG. 6 shows the positional relationship between the film width sensors and the film F being advanced. The distances of the film width sensors 18a, 18b and 18c to one edge of the film transport path are approximately set equal to the film widths of several types of films. As listed in Table 2, three types of films F can be identified by the signals from the film width sensors 18. Of course, the types (size) of film and the number of films which can be read can vary without departing from the scope of the invention.

TABLE 2

| Signal from film width sensors and film widths | | | |
|---|---|---|---|
| Film width | Sensor 18a | Sensor 18b | Sensor 18c |
| 355 mm | ON | ON | ON |
| 254 mm | ON | ON | OFF |
| 202 mm | ON | OFF | OFF |

Parameters for reading are set on a film-width basis. When a film F of 355 mm×431 mm is fed, the signals from the film width sensors 18a, 18b and 18c output to the system control module 1 are ON, ON and ON, respectively. The system control module 1 determines from these signals that the film F now being advanced has a width of 355 mm, and sets parameters for reading such as the pixel pitch and range of density and the destination of data transfer, as predetermined by the operator.

Figure 7:
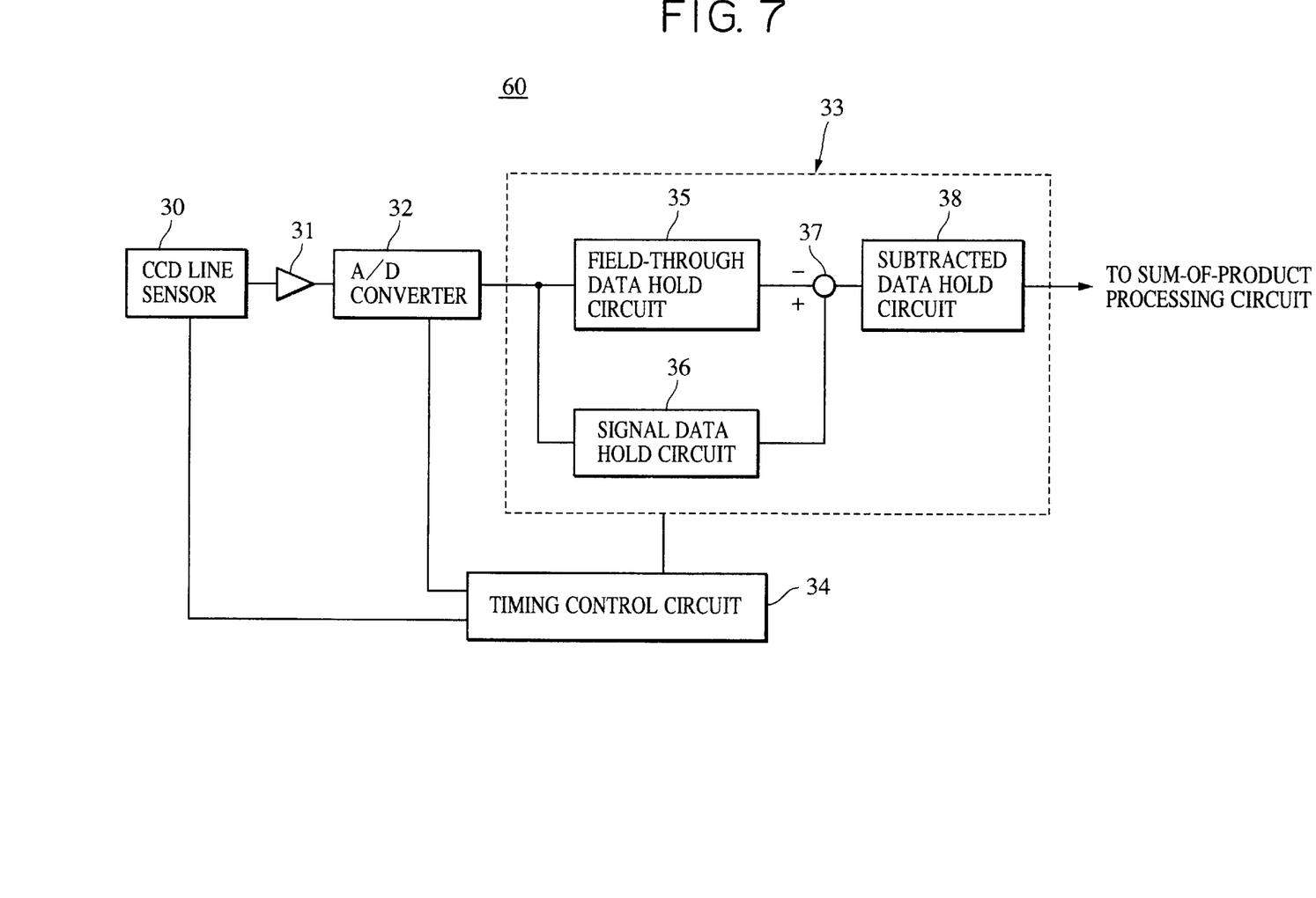
FIG. 7 is a block diagram of an output circuit of a solid-state CCD imaging apparatus.

FIG. 7 is a block diagram of the output circuit (noise reducing block 60) of a solid-state CCD imaging apparatus. The output of the CCD line sensor 30 is supplied to an A/D converter 32 via an amplifier 31. The output of the A/D converter 32 is connected to a noise reducing circuit 33 (digital CDS) enclosed by a dotted line. The CCD line sensor 30, the A/D converter 32 and the noise reducing circuit 33 are connected to a timing control circuit 34 for controlling the system.

The output of the A/D converter 32 is fed to a field-through data hold circuit 35 and a signal data hold circuit 36, the outputs of the field-through data hold circuit 35 and the signal data hold circuit 36 are fed to a subtracted data hold circuit 38 via a subtracter 37, and the output of the subtracted data hold circuit 38 is fed to a sum-of-product processing circuit to be described later.

The CCD line sensor 30 has an array of 7500 cells or pixels. The A/D converter 32 outputs digital values of 12 bits. The output of the noise reducing circuit 33 is constructed of signed 13 bits. The CCD line sensor 30 is not limited to the array of 7500 cells or pixels and may be an array of any required number of pixels. The A/D converter 32 is not limited to the 12-bit one, and may be of a type having any other number of bits.

Figure 8:
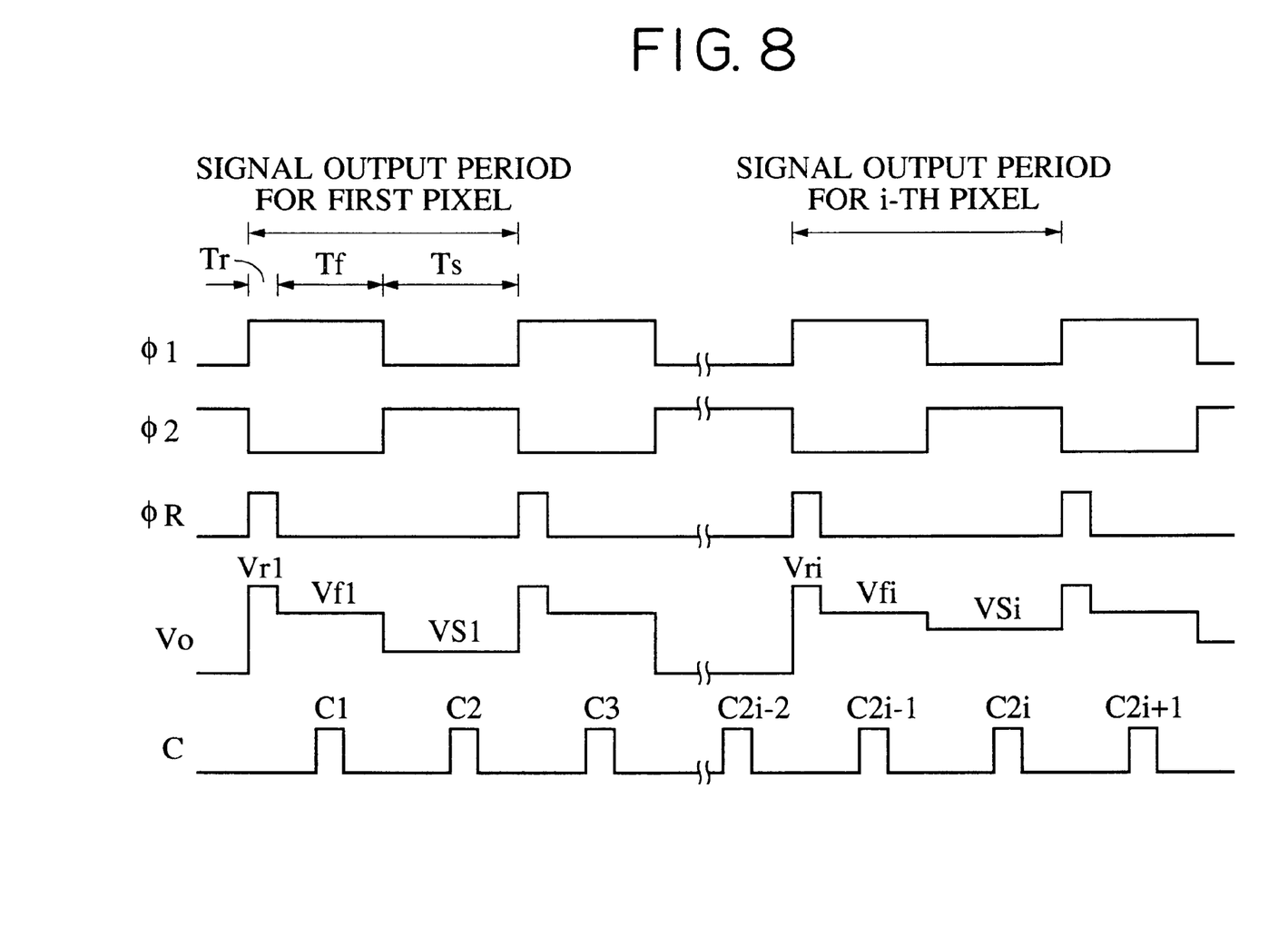
FIG. 8 is a timing diagram of the output signals in relation to a scanning period.

FIG. 8 is a timing diagram of the output signals of the CCD line sensor 30. φ1 and φ2 represent CCD pixel transfer clock signals, φR represents a reset clock signal, and Vo represents the output signal of CCD pixels. C represents a conversion pulse for the A/D converter 32, and at its timings C1, C2, . . . , the pixel signal output level V0 is converted into digital data. The CCD line sensor 30 outputs a charge quantity at each pixel in the form of voltage value in response to control signals φ1, φ2 and φR from the timing control circuit 34.

One signal output period from each pixel in the CCD line sensor 30 is made up of a reset duration Tr, a field-through duration Tf, and a signal duration Ts, and during respective durations, the output signal takes a reset level Vr, a field-through level Vf and a signal level Vs. This output voltage is adjusted in gain and level through the amplifier 31, and is then fed to the A/D converter 32.

The output signal from a first pixel is fed to the A/D converter 32. A field-through level Vf1 from the first pixel is converted into digital data D1 in response to the conversion pulse C1. The digital data D1 is held at the field-through data hold circuit 35. Next, the signal level Vs1 from the first pixel is converted into digital data D2 in response to the conversion pulse C2. The digital data D2 is held at the signal data hold circuit 36. The subtracter 37 subtracts the data output D1 of the field-through data hold circuit 35 from the data output D2 of the signal data hold circuit 36. The subtracted data X1 (=D2−D1) from the first pixel is then held at the subtracted data hold circuit 38.

In a similar fashion, a subtracted data Xi from an i-th pixel ($1 \leq i \leq P$, where P is the number of pixels per line) is obtained. A field-through level Vfi is converted into digital data D2i-1 in response to a conversion pulse C2i-1, and the digital data D2i-1 is held at the field-through data hold circuit 35. A signal level Vsi from the i-th pixel is converted into digital data D2i in response to a conversion pulse C2i, and the digital data D2i is held at the signal data hold circuit 36. The subtracter 37 subtracts the output D2i-1 of the field-through data hold circuit 35 from the output D2i of the signal data hold circuit 36, and the subtracted data Xi (=D2i−D2i-1) from the i-th pixel is held at the subtracted data hold circuit 38.

In this way, the data Xi, free from the effect of reset noise, is obtained by subtracting the field-through level Vf from the signal level Vs.

In the above embodiment, suppose that the random noise in the output stage of the CCD line sensor 30 and the amplifier 31 is governed by normal distribution. Let M represent its standard deviation, and the standard deviation of noise in the subtracted outputs is increased to $(M^2+M^2)^{1/2}=2^{1/2} \times M$. The amplitude of the signal component remains substantially unchanged in this process, and thus the signal-to-noise (S/N) ratio is expected to be worsened by approximately $2^{-1/2}$ times.

To improve the S/N ratio of the signal, each component of the field-through level and signal level is sampled a plurality of times. For example, when each component is sampled twice, the standard deviation M of noise is increased by $2^{1/2}$ times. The amplitude of the signal component is doubled, and the S/N ratio is improved by $2^{1/2}$ times. Thus, even if the subsequent subtraction operation degrades the S/N ratio by approximately $2^{-1/2}$ times, the original S/N is assured.

Figure 9:
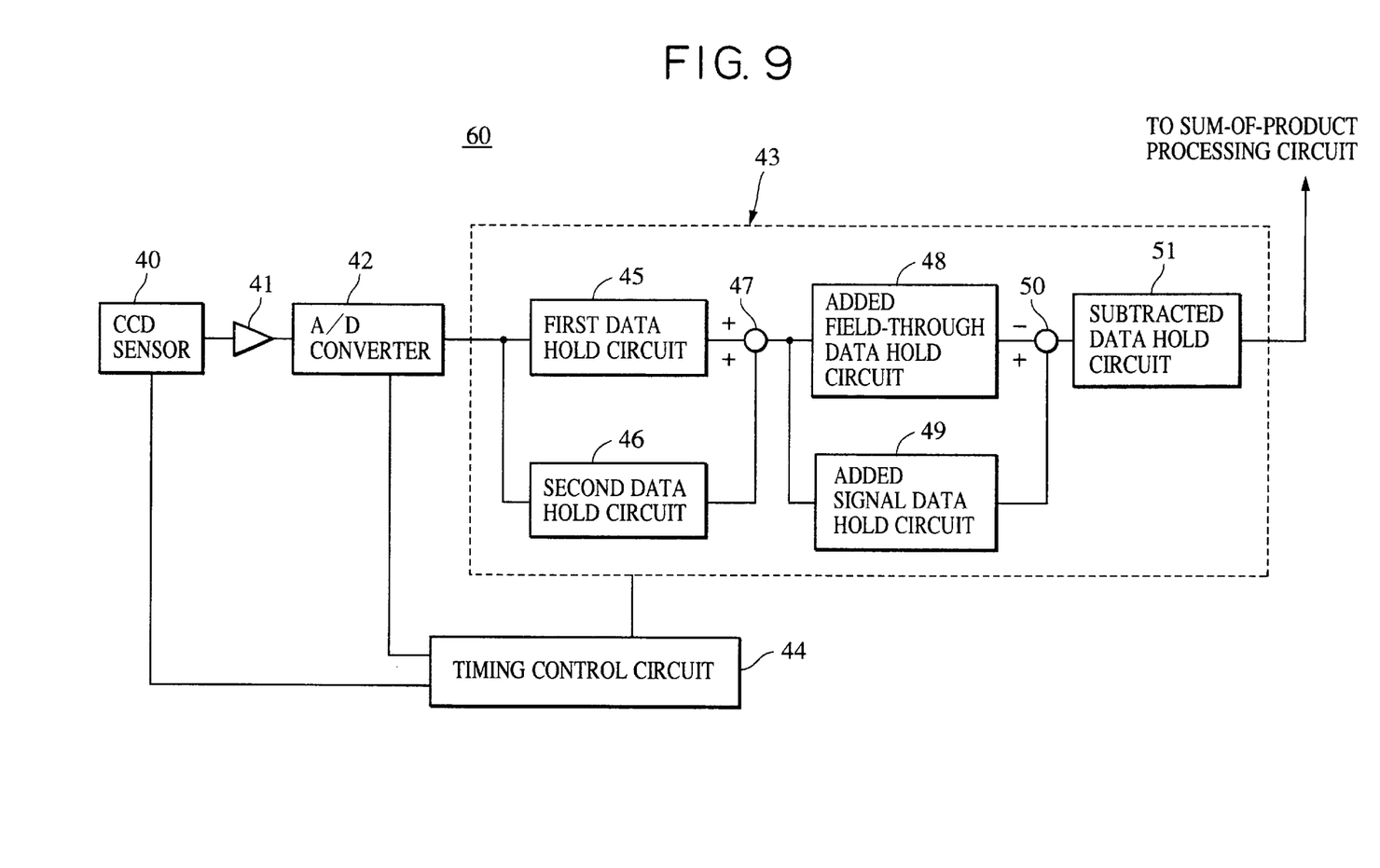
FIG. 9 is a block diagram of an output circuit of another solid-state CCD imaging apparatus.

FIG. 9 is a block diagram showing another embodiment. The output circuit (noise reducing block 60) of a CCD sensor 40 (corresponding to the CCD sensor 30 in the preceding embodiment) assures the initial S/N ratio by sampling each of the field-through level Vf and signal level Vs. The output of the CCD line sensor 40 is supplied to an A/D converter 42 via an amplifier 41. The output of the A/D converter 42 is connected to a noise reducing circuit 43 (digital CDS). The CCD line sensor 40, the A/D converter 42 and the noise reducing circuit 43 are connected to a timing control circuit 44 for controlling the system.

The output of the A/D converter 42 is fed to a first data hold circuit 45 and a second data hold circuit 46 in the noise reducing circuit 43. The outputs of the first data hold circuit 45 and second data hold circuit 46 are added through an adder 47 and then fed to each of an added field-through data hold circuit 48 and an added signal data hold circuit 49. The outputs of the added field-through data hold circuit 48 and the added signal data hold circuit 49 are fed via a subtracter 50 to a subtracted data hold circuit 51. The output of the subtracted data hold circuit 51 is fed to an external sum-of-product processing circuit to be described later.

The CCD line sensor 40 has an array of 7500 cells or pixels. The A/D converter 42 handles digital values of 12 bits. The output of the noise reducing circuit 43 is constructed of signed 14 bits. The CCD line sensor 40 is not limited to the array of 7500 pixels and may be an array of any required number of pixels. The A/D converter 42 is not limited to the 12-bit one, and may be of a type having any other number of bits.

Figure 10:
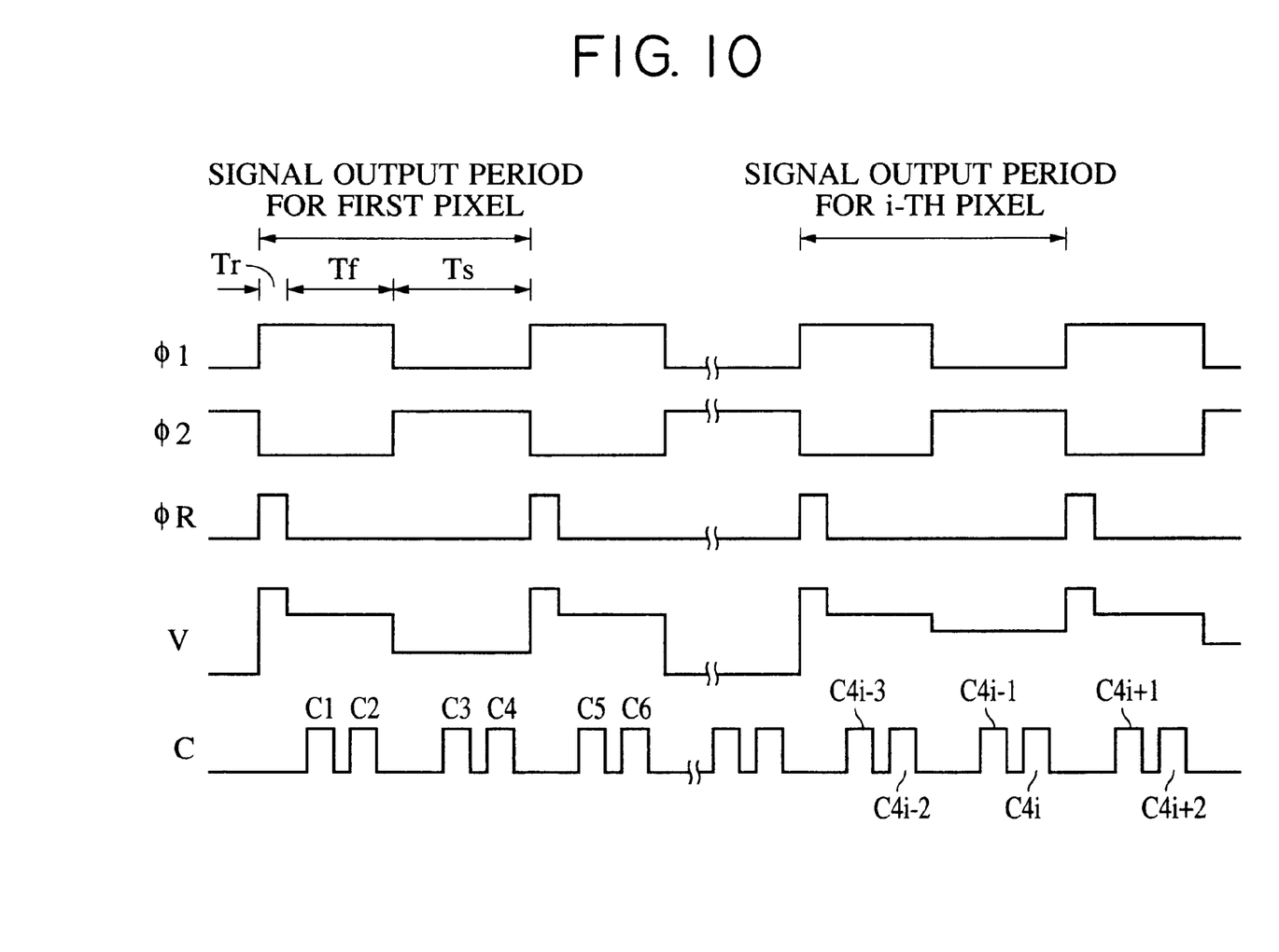
FIG. 10 is a timing diagram of the output signals in relation to a scanning period.

FIG. 10 is a timing diagram of the output signals of the CCD line sensor 40. $\phi 1$ and $\phi 2$ represent CCD pixel transfer clock signals, $\phi R$ represents a CCD pixel output reset clock signal, and V represents the output signal of CCD pixels. C represents a conversion pulse for the A/D converter 32, and at its timings C1, C2, ..., the pixel signal output level V is converted into digital data. The CCD line sensor 40 outputs a charge quantity at each pixel in the form of voltage value in response to control signals $\phi 1$, $\phi 2$ and $\phi R$ from the timing control circuit 44.

One signal output period from each pixel in the CCD line sensor 40 is made up of a reset duration Tr, a field-through duration Tf, and a signal duration Ts, and during respective durations, the output signal takes a reset level Vr, a field-through level Vf and a signal level Vs. This output voltage is adjusted in gain and level through the amplifier 41, and is then fed to the A/D converter 42.

The output signal from a first pixel is fed to the A/D converter 42. A field-through level Vf1 from the first pixel is converted into digital data D1 in response to the conversion pulse C1 and the digital data D1 is held at the first data hold circuit 45. Next, the signal level Vf1 from the first pixel is again converted into digital data D2 in response to the conversion pulse C2 and the digital data D2 is held at the second data hold circuit 46. The data outputs from the first data hold circuit 45 and the second data hold circuit 46 are added through the adder 47, and the added digital data (D1+D2) of 13 bits is held at the added field-through data hold circuit 48.

A signal level Vs1 from the first pixel is converted into digital data D3 in response to the conversion pulse C3, and the digital data D3 is held at the first data hold circuit 45. A signal level Vs1 from the first pixel is again converted into digital data D4 in response to the conversion pulse C4, and the digital data D4 is held at the second data hold circuit 46. The data outputs from the first data hold circuit 45 and the second data hold circuit 46 are added through the adder 47, and the added digital data (D3+D4) of 13 bits is held at the added signal data hold circuit 49.

The subtracter 50 subtracts the data output (D1+D2) of the added field-through data hold circuit 48 from the data output (D3+D4) of the added signal data hold circuit 49, and subtracted data X1={(D3+D4)−(D1+D2)} of the first pixel is held at the subtracted data hold circuit 51.

In a similar fashion, a subtracted data Xi from an i-th pixel ($1 \leq i \leq P$, where P is the number of pixels per line) is obtained. A field-through level Vfi from the i-th pixel is converted into digital data D4i-3 in response to a conversion pulse C4i-3, and the digital data D4i-3 is held at the first data hold circuit 45. A field-through level Vfi from the i-th pixel is again converted into digital data D4i-2 in response to a conversion pulse C4i-2, and the digital data D4i-2 is held at the second data hold circuit 46. The data outputs from the first data hold circuit 45 and the second data hold circuit 46 are added through the adder 47, and the added digital data (D4i-3+D4i-2) of 13 bits is held at the added field-through data hold circuit 48.

A signal level Vsi from the i-th pixel is converted into digital data D4i-1 in response to a conversion pulse C4i-1, and the digital data D4i-1 is held at the first data hold circuit 45. A signal level Vsi at the i-th pixel is again converted into digital data D4i in response to a conversion pulse C4i, and the digital data D4i is held at the second data hold circuit 46. The data outputs from the first data hold circuit 45 and the second data hold circuit 46 are added through the adder 47, and the added digital data (D4i-1+D4i) of 13 bits is held at the added signal data hold circuit 49.

The subtracter 50 subtracts the data output (D4i-3+D4i-2) of the added field-through data hold circuit 48 from the data output (D4i-1+D4i) of the added signal data hold circuit 49, and the subtracted data Xi={(D4i-1+D4i)−(D4i-3+D4i-2)} from the i-th pixel is held at the subtracted data hold circuit 51. The data Xi, free from the effect of reset noise, is obtained by subtracting the field-through level Vfi from the signal level Vsi in this way and is then fed to a sum-of-product processing circuit to be described later.

In this embodiment, each of the field-through level Vf and the signal level Vs is A/D converted twice, and respectively added, and added data of each component is subjected to subtraction. Alternatively, each of the field-through level Vf and the signal level Vs is A/D converted more than twice and then resulting data are respectively added to increase the number of bits of the data for each component and added data are subjected to subtraction. The effect of reset noise is removed and the S/N ratio of the output signal is even more improved.

In this embodiment, the CCD sensor 40 has a single output channel only. The CCD sensor 40 may have two channels, even and odd channels, or more channels. In such a case, the effect of reset noise is also removed as described above, and a plurality of outputs may be combined using a multiplexer.

The signed 14 bit image data Xi sequentially output may be subjected to a sum-of-product operation with image data prior to and image data subsequent to the image data Xi to increase the number of bits and improve the S/N ratio.

Figure 11:
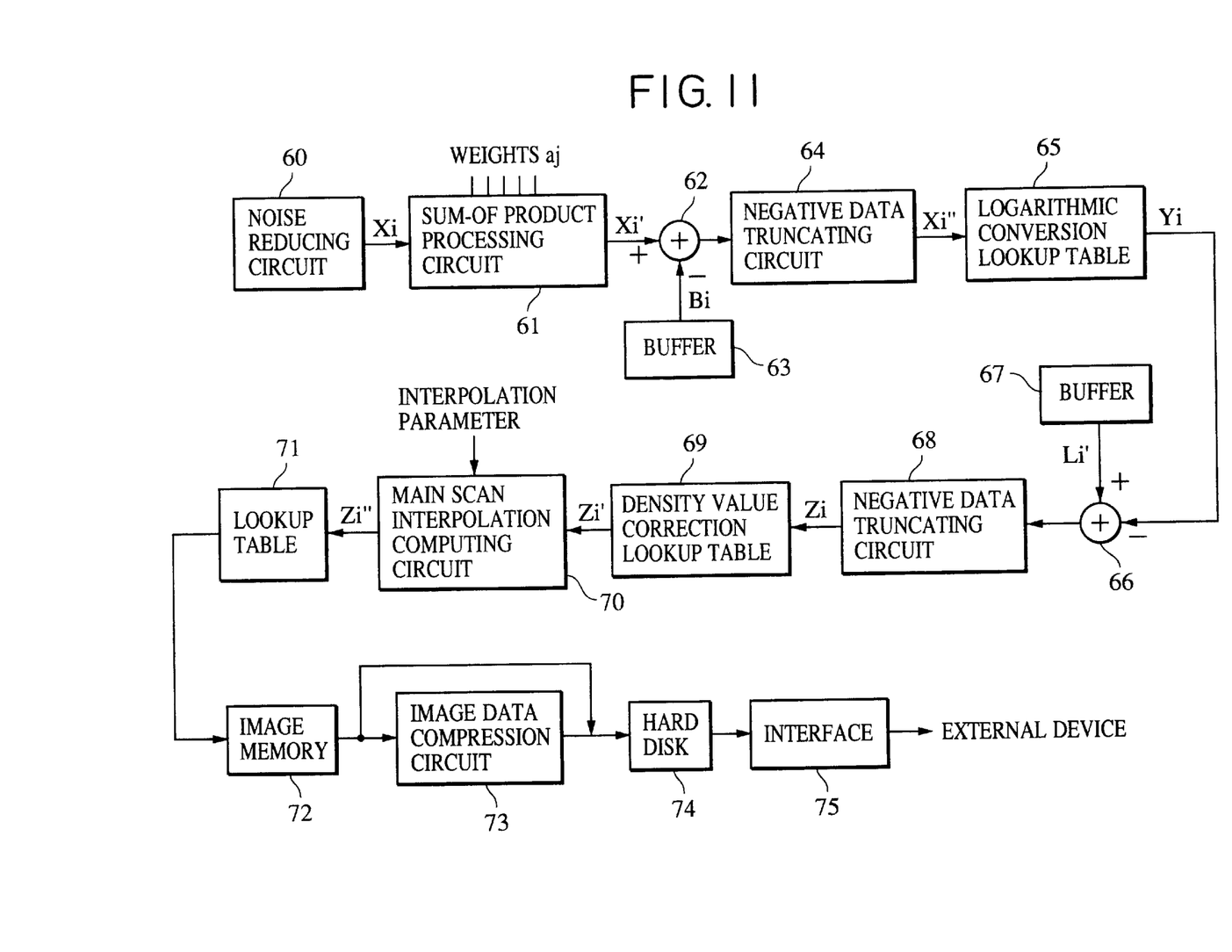
FIG. 11 is a block diagram of an output module of a sum-of-product processing device.

FIG. 11 is a block diagram showing the flow of read data. The output of the noise reducing block 60 is fed to a sum-of-product circuit 61, whose output is coupled with dark-state distribution data from a buffer 63 at a subtracter 62. The output of the subtracter 62 is fed to a negative data truncating circuit 64 and then to a logarithmic conversion lookup table 65. The output of the logarithmic conversion lookup table 65 is coupled with light-state distribution data from a buffer 67 at a subtracter 66. The output of the subtracter 66 is fed to a negative data truncating circuit 68 and then to a density value correction lookup table 69, whose output is coupled with an interpolation parameter at a main-scan interpolation computing circuit 70. The output of the main-scan interpolation computing circuit 70 is fed to a lookup table 71 for converting obtained data into a desired density range and is then stored in an image memory 72. The output data of the image memory 72 is fed via an image data compression circuit 73 to a hard disk drive 74 on one path while being directly fed to the hard disk drive 74 on the other path. The output of the hard disk drive 74 is then transmitted to an external device via an interface 75.

The signed 14-bit image data Xi is output from the noise reducing block 60 and input to the sum-of-product processing circuit 61. Let Xi ($1 \leq i \leq P$, where P is the number of pixels per line) represent image data, and Aj ($0 \leq j \leq m-1$) represent a weight, and the output Xi' of the sum-of-product processing circuit is computed as follows:

$$Xi' = \Sigma Aj \cdot Xi+j \quad (1 \leq i \leq P) \tag{1}$$

where $\Sigma$ represents the sum of products, Aj·Xi+j, for j=0, ..., j=m-1. The weight Aj may be determined based on the pixel pitch determined by the film width sensors 18, a desired S/N ratio or a desired resolution.

The buffer 63 stores 16-bit dark-state distribution data Bi that is determined by averaging a plurality of line data to reduce error when all lookup tables 65, 69 and 71 are linear with the halogen lamp 24 extinguished and the buffer 63 set to 0. The sum-of-product processed data Xi' is of 16-bit data that is increased to be larger in the number of bits than the data Xi. Thus, with the S/N ratio improved, the subtracter 62 subtracts the dark-state distribution data Bi as a corresponding offset component from the data Xi'. When the output with the dark-state distribution data reduced becomes negative, an error is considered as its cause and thus negative data is truncated and replaced with zeros. Specifically, the data Xi" is expressed as follows using a function Plus(*) for rounding negative data to zeros.

$$Xi'' = \text{Plus}(Xi'-Bi) \quad (1 \leq i \leq P) \tag{2}$$

The output X" is fed to the logarithmic conversion lookup table 65 for performing division. The logarithmic conversion lookup table 65 receives a 16-bit input and outputs a 16-bit output, and it gives an output Yi in response to the input Xi" as follows:

$$Yi = \text{Round}\{\log 10(Xi''+1) \cdot 13606.6+0.5\} \quad (1 \leq i \leq P) \tag{3}$$

where the function Round(*) means that fractions are omitted.

Transmittance of the film is now computed. Discussed next is how to obtain data in the buffer 67 to be used in the computation of transmittance. The logarithmic conversion lookup table 65 stores the above-described logarithmic conversion table and the halogen lamp 24 is lit. First, the light is not loaded to collect the light-state distribution data of the light source in the above arrangement. Let Li represent the light-state distribution data of the light source. According to the logarithmic conversion lookup table 65, distribution data Li' expressed in the following equation is computed and then stored in the buffer 67.

$$Li' = \text{Round}\{(\log 10(Li-Bi+1) \cdot 13606.6+0.5)\} \quad (1 \leq i \leq P) \tag{4}$$

The subtracter 66 subtracts the output Yi' from the stored data Li'. The transmittance of the film is computed by performing division in this way. The resulting output is a logarithmic value, namely a density output Zi, and is expressed in the following equation:

$$Zi = \text{Plus}\{Li'-Yi'\} \quad (1 \leq i \leq P) \tag{5}$$

When the output Zi becomes negative, the negative data truncating circuit 68 changes it to zero.

The density output Zi is corrected by the lookup table 69 in terms of the following error components.

(1) Correction of an error in transmittance (density value) arising from the effect of light directivities of a light receiving device and a light emitting device.

(2) Correction of an error in transmittance (density value) arising from light scattering on the surface of a collector optical system or the light receiving device.

(3) Correction of an error in transmittance (density value) arising from non-linearity characteristics of the light receiving device and an electric circuit.

Although the lookup table 69 cannot fully correct (2) the error component arising from scattering layer, it can be still corrected to some degree by making the lookup table 69 perform general conversion because scattering light tends to spread in a wide area. Specifically, when the film width is narrow, a large quantity of light directly from the light source is incident on parts of the optical system and the CCD device which are covered with no medium. Scattering light thus intensifies. Based on the outputs from the film width sensors 18, the content of the lookup table 69 may be changed to match the film width (the type of a film). The lookup table 69 is produced as follows: a medium having a standard density is beforehand read and the lookup table 69 is formed to cross-reference the read result with the density value.

Let Zi' represent the value corrected by the lookup table 69. The main-scan interpolation computing circuit 70 interpolates obtained image data to convert data in a required pixel pitch. Such an interpolation will have to be made in both the main-scan and sub-scan directions. Let v [mm/s] represent the advance speed of the film in the sub-scan direction and T [s] represent the storage time of the CCD device, and the pitch Xs in the sub-scan direction is expressed in the following equation:

$$Xs = v \cdot T \text{ [mm]} \tag{6}$$

The interpolation in the sub-scan direction is easily performed by adjusting the advance speed v or the storage time T. If the storage time T of the CCD device is modified to vary the pitch Xs, the light quantity of the light source is automatically adjusted so that the output of the CCD device remains at an appropriate level. The interpolation in the sub-scan direction is modified to comply with the pixel pitch set in accordance with the film width. The interpolation in the main-scan direction is now considered.

The computation of interpolation in the main-scan direction is as follows:

$$Zi'' = \Sigma\{Z'k-j \cdot W(n/2-j-\epsilon)\}, \quad k=\text{Round}(i \cdot Xf/Xo) \quad (1 \leq i \leq P) \tag{7}$$

where n represents the total number of pixels used before and after interpolation, Xf represents a desired sampling pitch in the main-scan direction, and Xo represents an actually acquired sampling pitch determined by the magnification of the optical system and the pixel interval of the CCD device.

Represented by $\epsilon$ is an offset in the sampling operation with the sampling pitches Xf and X0 as shown in the following equation:

$$\epsilon = i \cdot Xf/Xo - \text{Round}(i \cdot Xf/Xo) \quad (1 \leq i \leq P) \tag{8}$$

where $|\epsilon|<1$.

W(x) is a function that is central to the operation of interpolation, and when a linear interpolation is performed between two points, W(x) is defined with n=2 as follows:

$$W(x)=-x+1 (0 \leq x<1)$$

$$W(x)=x+1 (-<x \leq 0)$$

$$W(x)=0 (x \leq -1 \text{ or } 1 \leq x) \quad (9)$$

The sampling pitches Xf, Xo may be modified in accordance with the film width (the type of film), based on the outputs from the film width sensors 18. A similar interpolation operation may be performed in the sub-scan direction using a line buffer.

The lookup table 71 is used to expand resulting data into a desired density range. Since the density value Zi" obtained at the previous stage was processed in 16-bit computation, the following linear relationship in value holds true.

Zi"Density value
0 0
65535 4.816

Although in X-ray films, a density range of 0 to 3D is considered acceptable, setting the reading range of density on a film-width basis is at the option of an operator.

When the reading range of density is set to 0–3D, the lookup table 71 may be set to have the following linear relationship.

| Input | Output |
|---|---|
| 0 | 0 |
| L | K |
| Greater than L | K |

K is the maximum value the lookup table 71 can express in its available number of output bits. For example, K=4095 for a 12-bit output. L is a coefficient determined by the reading range of density, and in this case, 65535·3/4.816=40819.

The range of density and the number of bits are set on a film-width basis in this way. The range of density and the number of bits are selected referring to the outputs from the film width determining mechanism and then an appropriate lookup table 71 is set up. The lookup table 71 may be changed to output transmittance as final output image data, rather than density data. The setting of the lookup table 71 may be modified to perform a histogram equalization process or the like.

The output of the lookup table 71 is once written on the image data compression circuit 73 or the image memory 72 that works as a write buffer for the hard disk drive 74. The image data compression circuit 73 compresses the image data according to the JPEG specification that is a standard compression method. In this case, the image data is read from the image memory 72 on an 8×8 block basis, and the compressed data is transmitted to the hard disk drive 74. The compression operation may be skipped at the operator's option.

The operator adds specified header information to the predetermined image format. Available as the image formats are a JPEG format, a DICO image format, a PGM format and the like. The operator may set one of them on a film-width basis, and then the format to be used is automatically set based on the output from the film width sensor means 4. As the title of the image data, the film ID number read by the bar code reading device 17 is recorded.

The resulting output is written on the hard disk 74 that is a large storage buffer so that a delay time created in the data transfer to an external device through the interface 75 may not affect the apparatus in its reading time for each medium. Thus, the reading of the medium and the data transfer to the external device are virtually performed independently. The data written on the hard disk 74 is transmitted to a predetermined data transfer destination via the interface 75. The operator may set the data transfer destination on a film-width basis so that the destination is automatically selected based on the outputs from the film width sensors 18.

When a reading start instruction is issued from the control panel 2, a film width sensing is performed to determine a film width, and reading parameters such as a pixel pitch, a density range, and a data transfer destination are selected from among those beforehand set, and table update is made for a density linear conversion table according to the film width and an interpolation coefficient according to the pixel pitch. The film is read and image data is output.

The updating of the conversion tables and computation of the interpolation coefficient take time. A determination is made of whether a next film has the same film width as the film that was just read. If both films have the same film width, the next film is read under the same settings. The time required for reading the films is thus shortened.

When the current film is different in width from the film just read, the film width sensing is performed to select reading parameters in accordance with the film width. Table update is made for a density linear conversion table according to the film width and an interpolation coefficient according to the pixel pitch. The film is read and image data is thus output.

In the above embodiments, dedicated film width sensors 18 are used for film width sensing. Alternatively, the image reading CCD device may also be used for film width sensing. Specifically, the CCD device is used to pre-scan the head portion of a film and read data is once stored in the image memory. The system control module 1 reads this density data in the image memory. The portion of the film bearing no image, namely, the margin of the film, has density data smaller than a predetermined value, and thus creates a larger light quantity. Taking advantage of this effect, the margin of the film is recognized and then the film width is determined by counting the number of pixels within the film.

The reading parameter values are determined based on the film width. Film length sensing means may be used to set reading parameter values on a film-length basis. The sensing of the film length may be determined as follows. A film is advanced to be pre-scanned and the length of the film is determined based on the time the film width sensors 18 are on. The motor is then driven in reverse to reverse the film until the film forward edge meets the slits S. The film reading starts. In this way, the reading parameter values are set on a film-length basis.

Both the film width and length are sensed, and both in combination are used to set reading parameter values. In this way, reading parameter values are set on a film size basis in accordance with all film sizes.

According to the embodiments of the present invention, as described above, the operator is free from setting reading parameter values from film to film even when differently sized films are read. The apparatus having settings for different film sizes automatically performs any step in a full cycle of reading from reading to outputting, and a plurality of films are easily and efficiently read in succession.

What is claimed is:

1. An image reading apparatus for reading and outputting an image on a film and outputting image data comprising:

a film sensor section for sensing a film size, with said film sensor section including a film-width sensor for detecting a film width by being directly activated by the film;

an image reading system for reading photoelectrically the image on the film; and a signal output system for processing a signal including image information from the image reading system and outputting the processed signal, wherein at least one of the image reading system and the signal output system modify a parameter setting in processes therein according to the film size sensed by the film sensor section.

2. An image reading apparatus according to claim 1, wherein the signal output system modifies a pixel pitch in the image information, as the parameter setting, according to the film size.

3. An image reading apparatus according to claim 1, wherein the signal output system modifies a range of density in the image information, as the parameter setting, according to the film size.

4. An image reading apparatus according to claim 1, wherein the signal output system modifies the number of gradation in the image information, as the parameter setting, according to the film size.

5. An image reading apparatus according to claim 1, wherein the signal output system modifies a data format in the image information, as a parameter setting, according to the film size.

6. An image reading apparatus according to claim 1, wherein the signal output system modifies a destination of the image information, as a parameter setting, according to the film size.

7. An image reading apparatus according to claim 1, wherein the image reading system modifies either the advance speed of the film when read or the light storage time of an image reading light pickup device to modify a pixel pitch in the image information, as a parameter setting, according to the film size.

8. An image reading apparatus according to claim 1, wherein the image reading section and the signal output system also apply to a film to be read next the same parameter setting that was applied to the film that was just read when the film to be read next is identical in size to the film that was just read.

9. An image reading apparatus according to claim 1 further comprising a tray in which films to be read are stacked.

10. An image reading apparatus according to claim 9, wherein the tray is mounted such that the films are stacked with one corner of each of the films aligned.

11. An image reading apparatus according to claim 1, wherein the film sensor section is mounted midway of a transport path of the film.

12. An image reading apparatus according to claim 1 further comprising a member for reading a bar code arranged on the film.

13. An image reading apparatus according to claim 1, wherein said film sensor section includes a plurality of film-width sensors for detecting various film widths.

14. An image reading apparatus according to claim 1, wherein said film-width sensor also detects a length of the film.

15. An image reading apparatus according to claim 14, wherein the length of the film is detected based on the amount of time said film-width sensor is activated.

16. An image reading apparatus according to claim 1, wherein said film width sensor has a first position and a second position and is positioned so as to be directly activated by a sliding movement of the film such that contact of the film with said film width sensor causes said film width sensor to move from the first position to the second position, with the film width sensor defaulting to the first position when not in contact with the film.

17. An image reading method for reading an image on a film and outputting image data comprising the steps of:
providing a film-width sensor for detecting a film width;
sensing a film size with the film width sensor by being directly activated by the film; and
processing a signal including image information photoelectrically read and outputting the processed signal wherein in at least one of the processing step and the outputting step, a parameter setting in each of the steps is modified according to the film size sensed.

18. A method according to claim 17, the parameter setting is a pixel pitch.

19. A method according to claim 17, the parameter setting is a range of density.

20. A method according to claim 17, the parameter setting is the number of gradation.

21. A method according to claim 17, the parameter setting is a data format.

22. A method according to claim 17, the parameter setting is a destination of data output.

23. An image reading method according to claim 17, further comprising the step of providing a plurality of film-width sensors for detecting various film widths.

24. An image reading method according to claim 17, further comprising the step of detecting the length of the film with the film-width sensor.

25. An image reading method according to claim 24, wherein the length of the film is determined based on the amount of time the film-width sensor is activated.

26. A method according to claim 17, wherein the film width sensor has a first position and a second position, and further comprising the step of positioning the film width sensor so as to be directly activated by a sliding movement of the film such that contact of the film with the film width sensor causes the film width sensor to move from the first position to the second position, with the film width sensor defaulting to the first position when not in contact with the film.

27. An image reading apparatus for reading and outputting images on films and outputting image data comprising:
sensing means for sensing film sizes of respective films;
an image reading system for reading photoelectrically the images on the respective films;
setting means for setting parameters for signal processing of image signals of the images, said setting means being constructed so as to set the parameters according to film sizes independently by an operator; and
a signal output system for processing the image signals of the images from the image reading system and outputting the processed signals, said signal output system performing signal processing according to the parameters for signal processing set by said setting means corresponding to the film size sensed by said sensing means.

28. An apparatus according to claim 27, wherein said sensing means has a first position and a second position and is positioned so as to be directly activated by a sliding movement of the film such that contact of the film with the sensing means causes the sensing means to move from the first position to the second position, the sensing means defaulting to the first position when not in contact with the film.

29. An image reading apparatus for reading and outputting images on films and outputting image data comprising:
a sensor unit arranged in a path of transferring films, said sensor unit sensing film sizes of respective films;

an image reading system reading the images on the respective films photoelectrically;

a control panel for setting parameters for signal processing of image signals of the images, said control panel being constructed so as to set the parameters according to film sizes independently by an operator; and a signal output system processing the image signals of the images from the image reading system and outputting the processed signals, said signal output system performing signal processing according to the parameters for signal processing set by said control panel corresponding to the film size sensed by said sensor unit.

30. An image reading apparatus for reading and outputting images on films and outputting image data comprising:

sensing means for sensing film sizes of respective films;

an image reading system for reading photoelectrically the images on the respective films;

setting means for setting destinations of image signals of the images, said setting means being constructed so as to set the destinations of data transfer according to film sizes independently by an operator; and a signal output system for processing the image signals of the images from the image reading system and outputting the processed signals, said signal output system outputting the processed signal to the destination set by said setting means corresponding to the film size sensed by said sensing means.

31. An apparatus according to claim 30, wherein said sensing means has a first position and a second position and is positioned so as to be directly activated by a sliding movement of the film such that contact of the film with the sensing means causes the sensing means to move from the first position to the second position, the sensing means defaulting to the first position when not in contact with the film.

32. An image reading apparatus for reading and outputting images on films and outputting image data comprising:

a sensor unit arranged in a path of transferring films, said sensor unit sensing film sizes of respective films;

an image reading system reading the images on the respective films photoelectrically;

a control panel for setting destinations of image signals of the images, said control panel being constructed so as to set the destinations of data transfer according to film sizes independently by an operator; and a signal output system processing the image signals of the images from the image reading system and outputting the processed signals, said signal output system outputting the processed signal to the destination set by said control panel corresponding to the film size sensed by said sensor unit.

* * * * *

UNITED STATES PATENT AND TRADEMARK OFFICE
CERTIFICATE OF CORRECTION

PATENT NO. : 6,057,937
DATED : May 2, 2000
INVENTOR(S) : Satoshi Shimizu, et al.

It is certified that error appears in the above-identified patent and that said Letters Patent is hereby corrected as shown below:

Column 6,
Line 4, "VO" should read -- Vo --.

Column 11,
Line 14, "Zi" Density value 0 0 65535 4.816" should read -- Zi" Density value 0 0 65535 4.816 --.

Signed and Sealed this

Ninth Day of October, 2001

Attest:

NICHOLAS P. GODICI
Attesting Officer
Acting Director of the United States Patent and Trademark Office